ly Patent [19]

Fukuda et al.

[11] B 3,928,053

[45] Dec. 23, 1975

[54] METHOD OF IMPROVING THE GRADE OF PHOSPHORIC ACID BY-PRODUCT GYPSUM TO BE USED AS AN INHIBITOR FOR CEMENT SETTING AND ITS APPARATUS

[75] Inventors: Yoshiharu Fukuda, Tokyo; Toshio Onishi, Koshigaya; Akitoshi Takeuchi, Yokohama, all of Japan

[73] Assignee: Onoda Cement Company, Ltd., Onoda, Japan

[22] Filed: June 4, 1973

[21] Appl. No.: 366,402

[44] Published under the Trial Voluntary Protest Program on January 28, 1975 as document no. B 366,402.

[52] U.S. Cl. ............................................... 106/109
[51] Int. Cl.$^2$ ......................................... C04B 11/00
[58] Field of Search ............. 106/109, 110; 423/558

[56] References Cited
UNITED STATES PATENTS

| | | |
|---|---|---|
| 3,047,447 | 7/1962 | Stasse .................................. 106/109 |
| 3,159,497 | 12/1964 | Yamaguchi .......................... 106/109 |
| 3,199,997 | 8/1965 | Johnson .............................. 106/109 |
| 3,445,323 | 5/1969 | Schnabel............................. 106/109 |
| 3,489,583 | 1/1970 | Bloom et al. ....................... 106/109 |
| 3,547,581 | 12/1970 | Gauster et al. ..................... 106/109 |

*Primary Examiner*—J. Poer

[57] ABSTRACT

Powered limestone is dispersed in a hot gas stream to calcine it into quicklime, then powder of gypsum containing phosphoric acid contaminants is dispersely mixed into said hot gas stream containing the quicklime to form half hydrated gypsum and/or soluble anhydrous gypsum. Thus the limestone and gypsum are uniformly calcined, and the calcination products are thoroughly mixed. The calcined products are separated from the hot gas and then is subjected to hydration to form an improved quality of dihydrated gypsum.

1 Claim, 2 Drawing Figures

METHOD OF IMPROVING THE GRADE OF PHOSPHORIC ACID BY-PRODUCT GYPSUM TO BE USED AS AN INHIBITOR FOR CEMENT SETTING AND ITS APPARATUS

This invention relates to a method of improving by-product gypsum obtained in the production of phosphoric acid which gypsum may be used as an inhibitor for setting Portland cement, and also relates to apparatus for carrying out such method.

As an inhibitor for the setting of Portland cement (hereinafter referred to as merely cement), a mixture of cement clinker and a small amount of dihydrated gypsum has been used for a long time. As for gypsum, natural gypsum is preferably used. Gypsum, which is the by-product of the process of manufacturing phosphoric acid, cannot be used unless it is refined because soluble phosphoric acid contained in or attached to the gypsum crystals retards the setting of cement and deteriorates the mechanical strength of cement.

In Japanese Pat. No. 249,125 (Patent Application Publication No. 5544/1958) and Japanese Pat. No. 488,975 (Patent Application Publication No. 3918/1963), a method is disclosed in which quicklime is added to by-product gypsum before or after the latter is calcined into half hydrated or soluble anhydrous gypsum, and then the mixture is subjected to hydration to form dihydrated gypsum. The resulting dihydrated gypsum is free from phosphoric acid deterioration and the gypsum can be used as an inhibitor for setting cement.

The quicklime reacts with water to form calcium hydroxide, and any phosphoric acid contained in the gypsum reacts with the calcium hydroxide to form calcium phosphate.

As calcium phosphate is almost insoluble in water, it does not affect the hydration of cement. Therefore dihydrated gypsum containing soluble phosphoric acid may be converted to half hydrated or soluble anhydrous gypsum, and, thereafter, by subjecting it to rehydration in the presence of an alkali substance such as quicklime, the soluble phosphoric acid is converted to insoluble calcium phosphate and said gypsum is converted to dihydrated gypsum which is effective as an inhibitor for cement setting.

The calcination thereof is generally carried out in the rotary kiln. As an additive in this process, quicklime generally used. However this reacts with water and is difficult to handle and store. Also, when quicklime is added to a gypsum material having a water content, the lime is instantly hydrated and coagulates. As a result the lime is not uniformly dispersed in the gypsum mixture. If quicklime is added to calcined further processing is required to form a uniform mixture. Also, when the gypsum is calcined and as it becomes dry, it divides into a fine powder and does not readily flow through the rotary kiln.

The object of the present invention is to calcine gypsum uniformly, to eliminate the problems heretofore experienced in handling and using quicklime in the to mix calcined gypsum and quicklime uniformly without using any peculiar apparatus and to avoid troubles by making the apparatus with the fewest possible rotatable parts.

The present invention provides a method of improving the grade of by-product gypsum in the process of dispersing limestone powder in hot gas to convert it into quicklime, thereafter dispersing phosphoric acid by-product gypsum in the hot gas containing said quicklime thus calcining the gypsum into half hydrated or soluble anhydrous gypsum. The mixture of calcined gypsum and quicklime is subjected to hydration to form dihydrated gypsum. The apparatus of this invention comprises a hot gas stream generating source, a device for calcining limestone powder dispersed therein into quicklime, a device for dispersing powder gypsum into the hot gas containing said quicklime to calcine it into half hydrated or soluble anhydrous gypsum, a device for separating calcined powder from the gas stream and exhaust it to the outside of the calcining system and a device for hydrating the mixture of half hydrated or soluble anhydrous gypsum and calcined quicklime to form dihydrated gypsum.

The present application will be more fully understood with reference to the accompanying drawings in which.

Figure 1:
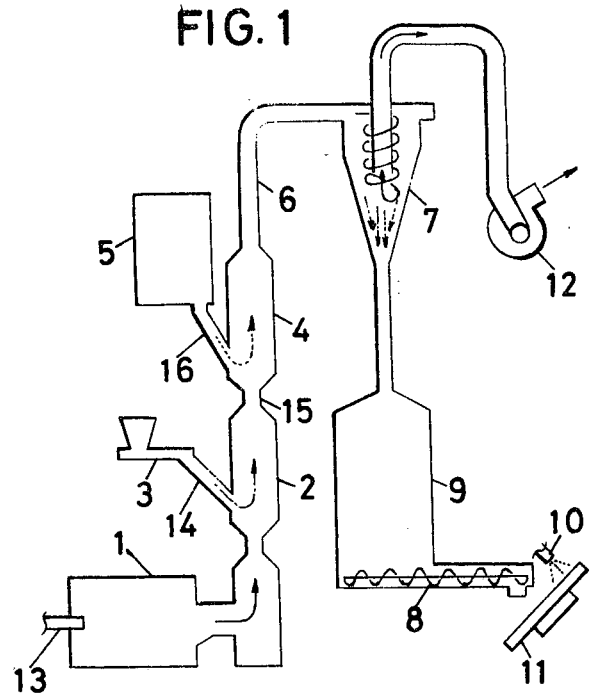
FIG. 1 is a diagrammatic side view of apparatus for carrying out the method of improving the grade of gypsum of the present invention.

In FIG. 1, numeral 1 designates a hot air furnace. This is connected to a limestone calcining tube 2 whose diameter is larger than that of any other connection conductor tube. A limestone feeder 3 is connected through a feeder pipe 14 to the gas inlet of said lime stone calcining tube 2. The gas outlet of limestone calcining tube 2 is connected to a hot gas conductor tube 15 which extends to the inlet of a gypsum calcining tube 4, which has a larger diameter than that of the conductor tube 15. A gypsum feeder 5 is connected to the inlet of the gypsum calcining tube 4 through a supply tube 16. The gas outlet of gypsum calcining tube 4 is connected to the inlet of a cyclone 7 through a conductor 6 through which gas containing calcined lime and gypsum passes. The lower opening of the cyclone 7 is connected to a calcining tank 9 provided with a drawer 8 at its bottom. The drawer 8 is further connected to a pan type pelletizer 11 provided with a water spray nozzle 10. A gas tube in the center of said cyclone 7 is connected to a gas exhaust fan 9.

In the apparatus, as illustrated, hot gas produced in hot gas furnace 1 calcines powder of limestone introduced and dispersed in the calcining tube 2 into quicklime. This lime is then introduced through hot gas conductor 15 into the gypsum calcining tube 4 where gypsum powder is added from the feeder 5 to calcine it into half hydrated and/or soluble anhydrous gypsum and therein the lime and gypsum are mixed. Thereafter, gas and solid materials are separated in the cyclone 7 and gas is exhausted from the exhaust fan 12. The mixture of quicklime and gypsum is then introduced to the tank 7.

Such calcined product is substantially a mixture of lime and half hydrated or soluble anhydrous gypsum. The product is then drawn from the tank 9 to the drawer 8 and supplied to the pan type pelletizer 11. Therein, the calcined product is subjected to hydration with water sprayed from the nozzle 10. Thus the calcined product is granulated and the grade of gypsum is improved.

The calcining tubes 2 and 4 preferably have a substantially large length in which powder material may be well dispersed. By reducing the diameter of the gas inlet of the tubes to a shape of throttle, hot gas is introduced therein at high speed, and, due to vortex produced therein, the powder material is dispersed in and is contacted by the hot gas to bring forth better heat exchange between the powder and gas, whereby calcination of material may be made in a short period of time.

In the limestone calcining apparatus shown in FIG. 1, limestone powder is introduced into calcining tube 2. However, as an alternative, a device may be provided to feed limestone directly into the hot gas furnace 1, or powder may be entrained in the air supplied to the gas burner for producing the hot gas stream. With such a modification, the lime calcining tube 2 may serve merely as conductor. If calcination of limestone is thoroughly accomplished in the furnace 1, tube 2 may be shortened or totally dispersed with.

Figure 2:
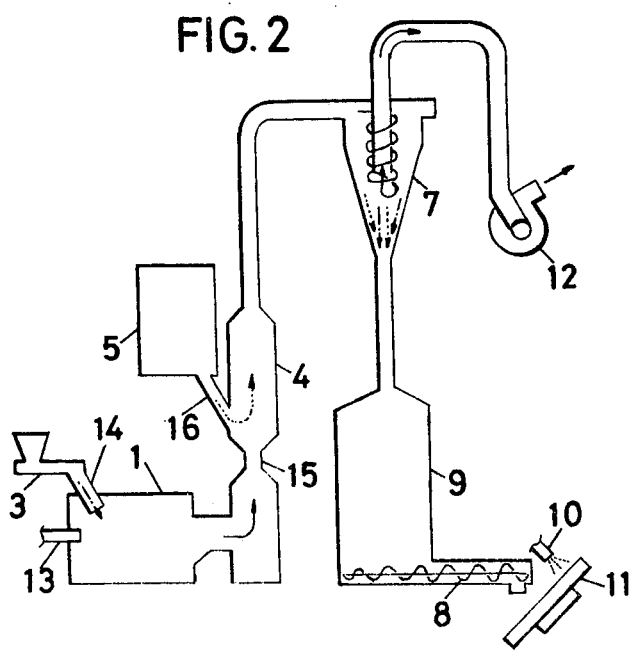
FIG. 2 is a diagrammatic side view of apparatus of another embodiment.

In FIG. 2, there is shown a second embodiment in which hot gas producing furnace 1 is provided with a burner 13, and limestone supply pipe 14 leading from limestone feeder 3. The hot gas producing furnace 1 is connected through a conductor 15 to a gypsum calcining tube 4.

Limestone powder is supplied from the feeder 3 through supply pipe 14 into the hot gas producing furnace 1 and calcined with hot gas or with the flame produced by combustion of fuel in burner 13. Then, together with hot gas stream, the powder is passed through the hot gas conductor 15 into a gypsum calcining tube 4.

Also, instead of supplying limestone directly to the hot gas producing furnace, it is possible to disperse the limestone in the combustion air being charged to the furnace, whereby the same effect can be obtained as in the apparatus shown in FIG. 2. That is, any device or method may be available, if it can calcine limestone effectively.

In the method described above, the hot gas and powder to be treated flow concurrently the calcining tubes, so that the lower temperature powder material and hot gas contact each other as they pass through tubes. As a result, the powder is gradually heated while the gas is cooled. Finally, the two come to the same temperature. It is of particular advantage that the gypsum material is thus uniformly calcined without being overheated. Such can be effected without using a rotary type kiln, as the calcining temperature in the device of the present invention is precisely regulated, whereby gypsum of uniform calcination can be obtained.

phosphoric acid ingredient contained in by-product gypsum to be calcined. Thus, the limestone to be supplied is not a substantial amount. Also the thermal heat consumption for decomposing the limestone is comparatively low. Yet the limestone to be calcined is preferably heat decomposed at high temperature in the fast flowing hot gas and converted into quicklime in a short time before the hot gas containing limestone enters in the gypsum calcining tube. Depending on the temperature of the gas and the size of the limestone granules, the conductor 6 as well as gypsum calcining tube 4 may be made longer so that the limestone shall be carried in the hot gas for a longer time. In calcining limestone according to the present invention, the hot gas at a temperature of 1,500° C or higher. Thus, when fuel is used, heat efficiency may be increased by utilizing a decreased ratio of air for combustion. Accordingly, fuel consumption may be minimized.

Now explanation is made on the embodiment of the present invention. The calcining apparatus is referred to in the accompanying drawings. As a hot gas source, combustion gas is supplied from an oil burner. The temperature of gas stream at the inlet of the limestone calcining tube 2 is 1,370° C. Limestone, pulverized to a powder (remaining part sieved with 88 microns mesh 3%), is introduced into the calcining tube 2 in an amount of 3 – 4% with respect to gypsum. The temperature of gas at the entrance of calcining tube 4 is 1,200° C. Phosphoric acid by-product gypsum (containing 20% water) is introduced into gypsum calcining tube 4. The temperature at the inlet of cyclone 7 is 200° C. The calcined product, having been separated from gas in the cyclone 7, is subjected to hydration with a water spray in pan type pelletizer 11 where it is formed into 5 – 20 mm granular dihydrate. This gypsum 3% is mixed with cement clinker and pulverized into cement of a granule smaller than that of remaining part sieved 88 microns mesh 3%.

According to the experiment, dissolution of lime stone into CaO was 95%. Analysis of the calcined gypsum by X-ray diffraction and chemical means indicated that the resulting gypsum contained about 1% dehydrated gypsum, about 3% half hydrated gypsum, with the rest being soluble anhydrous gypsum.

Now, comparison is made between the physical strength of cement obtained by the present invention and cement obtained by conventional gypsum treatment in the following Table.

Table

| Method of calcining gypsum | CaO% Added to gypsum | Test of cement setting | | | | Compression strength (Kg/cm²) | | |
|---|---|---|---|---|---|---|---|---|
| | | Water % | Initial setting time | | Final setting time | | After 3 days | After 7 days | After 28 days |
| | | | hour | min. | hour | min. | | | |
| The present invention | 3.5 | 26.7 | 3 | 03 | 4 | 05 | 128 | 227 | 420 |
| Conventional examples | 3.5 | 26.8 | 5 | 15 | 6 | 28 | 115 | 215 | 380 |
| | 6.7 | 26.7 | 3 | 22 | 4 | 19 | 125 | 227 | 419 |

In calcining limestone, it is said the limestone begins to decompose at a temperature of about 700° C. However, in the actual treatment, the limestone will not decompose at this degree of temperature. In the conventional rotary kiln or vertical type of furnace, calcination of limestone is effected at a temperature of 1,000° C or higher. In the present invention, limestone is supplied at a ratio of only several per cent which is sufficient to neutralize a substantial amount of soluble The results shown in the Table show that cement containing gypsum obtained by the present invention demonstrates normal setting and equal strength to cement containing gypsum which has been calcined with up to twice the amount of quicklime in a conventional rotary kiln.

What is claimed is:

1. Method of improving the grade of phosphoric acid by-product gypsum to be used as an inhibitor for cement setting comprising:
   A. Dispersing lime stone powder in hot gas stream to calcine it into quick lime,
   B. Dispersing phosphoric acid by-product gypsum powder in hot gas containing said quick lime to calcine it into half hydrated or soluble anhydrous gypsum,
   C. Separating calcined quick lime and gypsum from gas and then subjecting said calcined product to hydration.

* * * * *

UNITED STATES PATENT OFFICE
CERTIFICATE OF CORRECTION

PATENT NO. : 3,928,053
DATED : December 23, 1975
INVENTOR(S) : Yoshiharu Fukuda, et al.

It is certified that error appears in the above-identified patent and that said Letters Patent are hereby corrected as shown below:

Abstract, line 1, change "Powered" to --Powdered--;

Column 1, line 48, after "quicklime" insert --is--;
line 61, delete "in the".

Column 4, line 14, change "at a" to --can have a--.

Column 5, line 4, change "lime stone" to --limestone--; lines 5 and 7, change "quick lime" to --quicklime--.

Column 6, line 3, change "quick lime" to --quicklime--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*